Sept. 29, 1964  W. P. FABISCH  3,150,825
AIR CONDITIONING CONTROL APPARATUS
Filed March 11, 1963
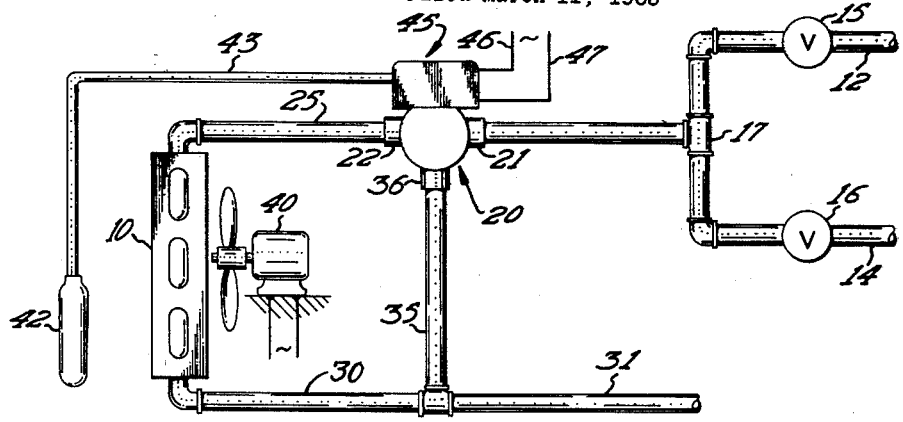
FIG 1
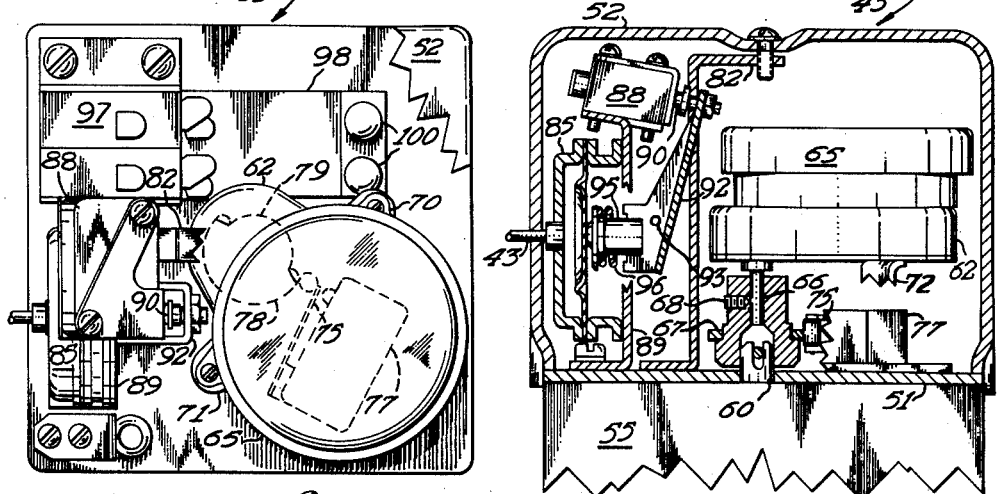
FIG 2
FIG 3
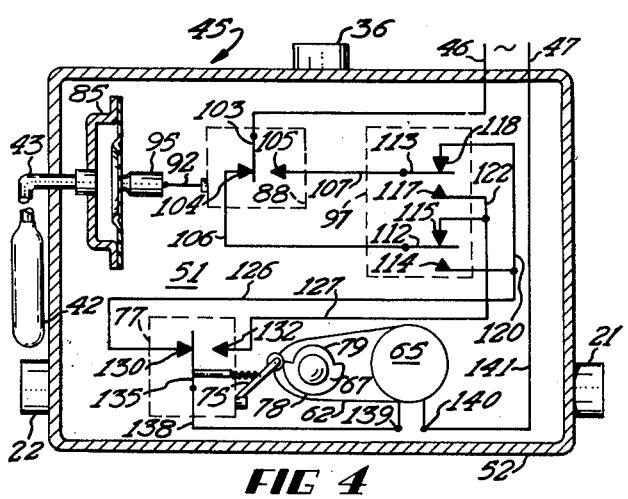
FIG 4
INVENTOR.
WARREN P. FABISCH
BY Joseph E. Ryan
ATTORNEY United States Patent Office 3,150,825
Patented Sept. 29, 1964

3,150,825
AIR CONDITIONING CONTROL APPARATUS
Warren P. Fabisch, Chicago, Ill., assignor to Minneapolis-Honeywell Regulator Company, Minneapolis, Minn., a corporation of Delaware
Filed Mar. 11, 1963, Ser. No. 264,426
6 Claims. (Cl. 236—1)

My invention relates to air conditioning control apparatus and more particularly to an improved air conditioning control apparatus having a simplified motorized valve including control components included therewith.

While air conditioning control apparatus utilizing motor operated valve control apparatus is well recognized, the present invention is directed to an improved air conditioning control apparatus and in particular to an improved motorized valve apparatus which utilizes a simplified motor configuration with a two position switching type sensing means or thermostat for control of the same and with provisions for summer-winter changeover utilizing the same components. The valve operated by the motor is of the type which is operated through a predetermined limited input shaft rotation, such as a 180° rotation to open predetermined ports in the valve, and through a similar angular rotation in the same direction consecutively to close the aforementioned ports and open additional pair of ports through the valve. This configuration may be a two or three way valve and the normal operation would be steps of 180° rotation for opening and closing of respective valve ports. This permits the use of a unidirectional motor with a simplified construction such as a clock drive type motor device while at the same time permitting the control of the same through a conventional closed thermal system and associated switching apparatus with additional provisions for summer-winter changeover or reversal effect of the operation of the thermostat on the energization of the valve motor. Therefore it is the object of this invention to provide in an improved air conditioning apparatus a simplified motorized valve control with provisions for summer-winter changeover. Another object of this invention is to provide an improved motor operated valve control apparatus, which is simplified in design and economical in manufacture and requires substantially no maintenance. These and other objects of the invention will become apparent from reading of the attached description together with the drawings wherein:

FIGURE 1 is a schematic type diagram of an air conditioning control apparatus showing the application of a subject invention, FIGURES 2 and 3 are plan and elevation views respectively of the improved motor operated valve combination, in section, and FIGURE 4 is a schematic diagram including a circuit diagram of the improved motorized valve.

The improved air conditioning control apparatus is shown schematically in FIGURE 1 as embodying the principle of the subject invention includes a heat exchanger indicated generally at 10 which is adapted to receive either a hot or cold air conditioning medium, such as water. The supply pipes or conduits for the air conditioning medium are indicated generally at 12 and 14 with manual valves 15, 16 included in series therewith leading to a common pipe at 17. This pipe is connected to the motorized valve indicated generally at 20 at the inlet passage or port indicated at 21. The outlet passage from the motorized valve is indicated as motorized valve outlet port 22 and is connected through a pipe 25 to the heat exchanger 10 and from the heat exchanger through a pipe 30 to the return pipe 31 leading to the source of the air conditioning medium. A bypass pipe 35 around the heat exchanger 10 connects the return pipe 31 and a bypass port 36 in the motor operated valve. With this arrangement which utilizes a three way valve configuration, the air conditioning medium, whether hot or cold, will be valved by the valve 20 through the heat exchanger or bypassing the same depending upon whether in its desire to affect a change in the surrounding air. The heat exchanger has a circulation means such as the fan 40, which would have suitable control means connected thereto (not shown) for directing a flow of air across the heat exchanger for tempering the same. This air flow is adapted to be discharged to a space to be air conditioned and depending upon whether the flow of the air conditioning medium is through the heat exchanger 10 or not, the improved motorized valve of the air conditioning control apparatus can be said to be controlling with respect to a demand or lack of demand for a change in temperature the space to be air conditioned. This motorized valve is controlled by means of a closed thermal system which includes a sensing bulb indicated generally at 42 which bulb is connected by means of a capillary 43 to the motor portion 45 of the motorized valve. This section includes electrical power leads indicated generally at 46, 47 respectively. The motorized valve is shown in detail in FIGURES 2 and 3 and schematically including the wiring diagram in FIGURE 4 as will be hereinafter described.

The details of the valve 20 are omitted herein since it may take many forms, and is largely conventional. Basically the valve includes the inlet 21, bypass 36 and outlet 22 ports and an input shaft designed to impart rotation to the movable valve element which is rotated through a predetermined angular rotation, such as 180° rotation for connecting one pair of ports, such as inlet and outlet, and in consecutive rotation of the same angular degrees to close the outlet port and connect the inlet port and bypass port. With this type of valve, a simplified motor design of the unidirectional type may be utilized with simple control apparatus for controlling the energization of the same.

Thus as is shown in FIGURES 2 and 3, the improved motorized valve is shown in plan and side elevation views respectively with a portion of the valve body which is broken away. The motorized section 45 includes an enclosure comprising a base part 51 and a cover part 52. The base is attached to or suitably connected to the valve body 55 whose input shaft extends into and through the base such as is indicated at 60. This input shaft is connected to a gear train section 62 of the motor 65. The motor is shown in block form since it is of the conventional clock motor type which is unidirectional in rotation and relatively inexpensive as a control component. Its output pinion or shaft 66 has mounted thereon a cam 67 which is keyed to the output shaft through a suitable key means 68. Motor 65 which will be best seen in FIGURE 2 has mounted to its normal mounting flanges indicated at 70 and 71, a pair of brackets 72 (FIGURE 3) which attach the motor to the base 51 securing the same thereto through a suitable means (not shown). Thus the motor 65 with its gear train section 62 is mounted as a unit on the base and secured thereto. The movement of its output shaft will drive the cam 67 and the input shaft 60 of the valve as the gear train rotates.

Associated with cam 67 is a pivoted follower 75 which rides on the surface of the cam and cooperates with a single pole double throw switch 77 mounted on the base 51 of the motor housing. The switch 77 is of the type which is biased to one position and moves to the opposite switch closing position under influence of the cam follower as it rides on the surface of the cam. The contour of the cam is best seen in FIGURE 2 in phantom as a rise portion 78 and a dwell portion 79 which cover respectively one half the surface of the cam to correspond with the positions of operation of the valve. The purpose of the cam and switch is to indicate the operation of the valve through the motor to predetermined operating positions and to hold the valve in such a position.

Also mounted on the base 51 is an upstanding bracket 89 which mounts an expansion element 85 of the closed thermal system with the sensing bulb 42 and capillary 43 connected thereto. Bracket 89 provides a mounting for a second single pole double throw switch 88 which is mounted thereon through suitable means (not shown). A second bracket 82 on base 51 provides the mounting and connection for cover 52. Switch 88 has its operating button 90 engaged by a lever or linkage 92, pivoted at 93, which is connected through a thrust pin 95 of the lever 92 for operation thereby. The expansion element engages an overtravel spring 96 on pin 95 and movement of the lever 92 with the pin 95 upon expansion or contraction of the element 85 engages the switch button 90 of the single pole double throw switch 88 for operation of the same. This switch is also of the type which is biased to one position so that as seen in FIGURE 4 expansion of the expansion element will cause the lever 92 to engage the button 90 and depress the same to move switch 88 to a position opposite that in which it is normally biased.

In addition to switches 77 and 88, the drive and control portion of the motorized valve includes a double pole double throw switch indicated at 97 which is mounted on the base 51 of the motor mounting structure, as best seen in FIGURE 2, and has cooperating therewith for operation of the same a bimetal blade 98 which is secured to the base structure 51 through a suitable means such as screws or rivets 100. The bimetal is exposed on the base in proximity with the valve body 55 such that it will respond to the temperature of the same so as to be exposed to the temperature of the fluid medium being valved. This double pole double throw switch with the bimetal actuator provides a thermally operated means for summer-winter changeover in the operation of the closed thermal system on the valve. Under normal conditions the valve will be used for control of flow of hot or cold water or a temperature changing medium as disclosed in FIGURE 1 and changeover of the temperature of the supply will be determined by other control apparatus not incorporated in the apparatus as shown in FIGURE 1. Thus hot or cold water will be supplied to the valve and temperature of the same will be transmitted by conduction through the valve body to heat the surrounding parts such as the base 51 of the motor mounting structure to influence the bimetal and change its position. The double throw double pole switch assembly in the reversing unit which is connected in circuit with the switch 88 of the closed thermal system or thermostat will reverse the operation of the same on the energizing circuit of the motor as will be hereinafter described. This switch is also of the type biased to one operating position through internal means (not shown) and is operated to the opposite switching position by engagement of its buttons (not shown) with the bimetal upon change in temperature of the base 51. Such a switching operation will take place seasonally and the switch-over is ineffective with minor variations in temperature of the air conditioning medium supplied to heat exchanger.

The overall configuration of this motor operated valve is shown schematically in FIGURE 4 including a circuit diagram for the energizing circuit of the motor 65. Thus, as shown in FIGURE 4, the valve body 55 with the base 51 thereon mounts the motor 65 and switches 77, 88 and 97. In addition, although not shown in the schematic diagram, the bimetal actuator 98 of the switch 97 is included in the base 51. The power source 46, 47 in FIGURE 4 represents an alternating current source of supply with the conductor 46 leading to the movable contact 103 of the single pole double throw switch 88 for the stationary contacts 104, 105 and these contacts are connected by means of conductors 106, 107 to input terminals and the movable contacts 112, 113 of double pole throw switch 97 which is the summer-winter changeover switch or reversing switch. Switch 97 includes stationary contacts 114, 115 associated with the movable contact 112 and stationary contacts 117, 118 associated with the movable contact 113 to provide the double pole double throw configuration. This switch is connected in the conventional reversing circuit in which opposite contacts of the respective pair are connected in common. Thus, the contact 114 is connected to the contact 118 by a common conductor 120, and contacts 115 and 117 are connected in common by the conductor 122. These common conductors are connected by means of conductors 126, 127 to stationary contacts 130, 132 of the single pole, double throw limiting or limit switch 77. Switch 77 includes a movable contact 135 which is operated by the cam follower or lever 75 associated with the switch 77 and operating on the surface of cam 67. The movable contact 135 is connected to a conductor 138 to the inlet terminal 139 of the motor the opposite terminal 140 being connected to a conductor with 141 to the supply conductor 47 of the alternating current source. Thus the power is supplied from the conductor 46 through the movable contact 103 to one or the other of contacts 104, 105 of the switch of the closed thermal system or the thermostat. This circuit is completed through one or the other of conductors 106, 107 depending upon the position of switch 88 to one or the other of the movable contacts 112, 113 of the reversing or double pole double throw switch assembly 97 performing the summer-winter changeover function. Since the contacts 112, 113, operate simultaneously in the same direction as a ganged unit or the equivalent thereof, either of the contacts 118, 115, or contacts 114, 117 will be engaged with the movable contacts 112, 113. This will set up the circuit through the conductors 126, or 127 to the motor operated limit switch 77 through its stationary contacts 130, 132. The circuit is completed through the movable contact 135, conductor 138 of motor 65 to the supply conductor 47.

In operation, the energization circuit for the motorized valve is initiated by the closed thermal system resulting from a change in ambient temperature surrounding the bulb 43 and causing the expansion element 85 to respond to either contracting or expanding depending upon the temperature change sensed. Assuming that a rise in temperature is experienced, either the liquid or vapor fill within the closed thermal system will cause expansion of the element 85 causing the pin and link assembly 95, 92 to actuate the switch 88. With expansion of the expansion element 85, as shown in schematic diagram of FIGURE 4, the contacts 103, 105 will be engaged and a circuit will be made through the switch from conductor 46 to the movable contact 113 of the reversing switch 97. Depending upon whether the temperature sensing element associated therewith, that is the bimetal 98, is warped or not, one or other of the contacts, 117, 118 will be engaged to provide a circuit through the conductors 126, 127. Assuming that the temperature changing medium is hot water and the bimetal 98 responding to the temperature of the base 51 of the motorized valve is warped, it will be assumed that the contact 113 is engaged in with contact 118 and the circuit will be made through the conductor 126 to the stationary contact 130 of the limit switch 77 operated by the motor 65, cam 67 combination. It will also be assumed that in this condition the contacts 130, 135 will be made indicating a predetermined particular position of the motor and the valve shaft for a given condition of operation of the valve. It will be assumed that the valve would be open through the inlet port 21 to the outlet port 22 causing fluid to flow through the motorized valve to the heat exchanger cam associated therewith. The circulator means generally associated with the heat exchanger would cause the air circulating across the heat exchanger to pick up heat and discharge it to the space to be air conditioned. Thus, upon a rise in temperature in the space the energizing circuits identified above through limit switch 77 would cause the motor to be energized and rotate in an unidirectional type of operation advancing the motorized cam from the high or rise portion 78 to the dwell portion 79 at which point the contacts 131, 135 would be broken and the contacts 132, 135 would be made. This would, however, open the energization circuit for the motor and the motor would be de-energized. In this condition of operation of the valve, the output conduit 22 through the valve would be closed and the bypass conduit 36 would be opened permitting flow from the inlet 21 to the bypass conduit and around the heat exchanger in the fluid flow circuit as defined by the conductors 35, 31 in FIGURE 1. This would cause a reduction in heat being discharged to space to be air conditioned inasmuch as the heat exchanger would be no longer receiving the temperature changing medium and the air being discharged therefrom would allow the temperature to drop. At the time that the space temperature drops to a point where the sensing bulb 42 and the expansion element 85 associated therewith contract, the circuit to the contacts 105 and 103 would be broken and the circuits 103 and 104 made. This would set up a new energization circuit for the motor from the conductor 46 through the switch 88 and the movable contact 112 of the reversing switch, through the contact 115 and conductor 127 to the contact 132, 135 of limit switch 77 driven by the motor. Inasmuch as this circuit would have already been made by virtue of operation of the cam on the dwell portion 79, the energization circuit for the motor again would be initiated causing the motor to become energized and rotate through 180° rotation to the rise portion of the cam 78 at which point the limit switch 77 would again be operated opening the energization circuit and at the same time closing the bypass connection through the bypass ports 36 and opening the outlet port 22 of the valve to supply the temperature medium to the heat exchanger.

This apparatus will operate as a basically two position device energizing the motor to operate the valve from open to close position with respect to the outlet and bypass ports as the temperature sensing means or the closed thermal system and its expansion element 85 respond to the temperature of the space.

At the time of summer-winter changeover when one or the other of the supply pipes as for example, the heating pipe is closed to the valve 20, the new air conditioning medium or the cool air conditioning medium will be supplied either through the same or separate supply pipe depending upon the type of temperature changing apparatus involved. Thus, for example, assuming the valve 15 is closed from the warm supply pipe 12 in FIGURE 1 and the valve 16 is open for the supply pipe 14, the cool air conditioning medium will be supplied to the valve 20 to flow through the heat exchanger. Under these conditions of effect the cooling medium applied from the valve body 55 to the base 51 of the motorized valve will influence the bimetal 98 to cause the reversing switch 97 or the summer-winter changeover apparatus to reverse or assume a new operating position. Thus, the contacts 113, 117 and 112, 114 will be made setting up a new circuit through the reversing switch 97 or reversing the connections between the conductors 126, 127. With this changeover, a rise in temperature surrounding the bulb 42 and expansion of the expansion element 85 will operate the switch 88 associated therewith in a direction to make contacts 103, 105. In this new circuit, the conductors 113, 117 from the temperature sensing switch 88 will provide a circuit through the conductor 127 to the motor limiting switch 77 and the motor 65. It will be noted that in this circuit the contacts 132, 135 must be made before the circuit can be energized and in this position the valve will be reversed in operation from that for the heating cycle. The operation of the apparatus will be similar on the heating and cooling cycle and the automatic changeover of the control apparatus or summer-winter changeover utilizing the same simplified thermostat with the single pole double throw switch may be utilized for both summer or winter operation. Further, the use of the unidirectionally operated motor and the limited rotation input type valve with the associated limit switch 77 permits two position operation in a motorized valve with a very simplified control circuit and apparatus.

Therefore in considering this invention it should be remembered the present disclosure is intended to be illustrative only and the scope of invention should be determined only from the appended claims.

I claim as my invention:

1. In a motorized valve, a unidirectionally operated motor, valve means connected to said motor to be operated thereby, said valve means being of the type which operates between valve operating positions upon operation of said motor through consecutive rotations of 180°, means mounting said motor means on said valve and connecting said motor to said valve means, an output cam driven by said motor and having rise and fall portions thereon over respectively 180° of said cam, a limiting switch means, said limiting switch means cooperating with said cam for operation thereby, a closed thermal system including a sensing bulb and an expansion element connected with a capillary, two position switching means associated with said expansion element, said two position switching means being operated between its switching positions with predetermined changes in ambient temperature as sensed by said sensing bulb, a double throw double pole switch means and a temperature responsive means associated therewith adapted to operate said switch means between switching positions, means positioning said last-named, temperature responsive means on said valve means to be responsive to the temperature of fluid adapted to be valved by said valve means, and circuit means adapted to be connected to a source of power and connected through said two position switching means, said double pole double throw switching means and said limiting switch means to said motor in a series circuit.

2. In a motorized valve, a unidirectionally operated motor, valve means connected to said motor to be operated thereby, said valve means having operating positions corresponding to limited rotation of said motor, means mounting said motor means on said valve means and connecting said motor to said valve means, an output cam driven by said motor and having rise and dwell portions corresponding to the operating positions of said valve means, a limiting switch means including a follower means operated means cooperating with said cam, a closed thermal system including a sensing bulb and an expansion element connected with a capillary, two position switching means associated with said expansion element, said two position switching means being operated between its switching positions with predetermined changes in ambient temperature as sensed by said sensing bulb, a double throw double pole switch means and a temperature responsive means associated therewith adapted to operate said switch means between switching positions, means positioning said last-named temperature responsive means on said valve means to be responsive to the temperature of fluid being valved by said valve means, and circuit means adapted to be connected to a source of power and connected through said two position switching means, said double pole double throw switching means and said limiting switch means to said motor in a series circuit.

3. In a motorized valve, a unidirectionally operated motor, valve means connected to said motor to be operated thereby, said valve means being of the type which operates between valve operating positions upon rotation of said motor through consecutive limited rotations of less than 360°, means mounting said motor means on said valve and connecting said motor to said valve means, an output cam driven by said motor and having rise and fall portions corresponding to said limited consecutive relations of said motor, a two position limiting switch means, said limiting switch means cooperating with said cam for operation thereby, a closed thermal system including a remote sensing bulb and an expansive element at said motor connected thereto a two position switching means associated with said expansion element, said two position switching means being operated between its switching positions with predetermined changes in ambient temperature as sensed by said sensing bulb, switch means for summer-winter changeover connected to the two position switching means for reversing the connections therefrom, a temperature responsive means associated with said changeover switch means and adapted to operate said changeover switch means, means positioning said last-named temperature responsive means on said valve means to be responsive to the temperature of a fluid adapted to be valved by said valve means, and circuit means adapted to be connected to a source of power and connected through said two position switching means, changeover switch means and said limiting switch means to said motor in a series circuit.

4. In a motorized valve, a unidirectionally operated motor, valve means connected to said motor to be operated thereby, said valve means having operating positions corresponding to limited rotation of said motor, means mounting said motor means on said valve means and connecting said motor to said valve means, an output cam shaft driven by said motor and having rise and dwell portions corresponding to the operating positions of said valve means, two position limiting switch means cooperating with said cam for operation thereby, a closed thermal system including a sensing bulb and an expansion element, two position switching means associated with said expansion element being operated between its switching positions with predetermined changes in ambient temperature as sensed by said sensing bulb from a predetermined temperature, summer winter changeover switch means and a temperature responsive means associated therewith adapted to operate said changeover switch means between reversing switch positions, said changeover switch means being connected to and cooperating with two position switching means for reversing the effect of its operation, means positioning said last-named temperature responsive means on said valve to be responsive to the temperature of a fluid adapted to be valved by said valve means, and circuit means adapted to be connected to a source of power and connected through said two position switching means with said changeover switch means associated therewith and said limiting switch means to said motor in a series circuit.

5. In a motorized valve, a unidirectionally operated motor, valve means connected to said motor to be operated thereby, said valve means being of the type which operates between two valve operating positions upon rotation of its input shaft through consecutive rotations of 180°, means mounting said motor means on and connecting it to said valve, switch means operated by said motor and having limiting switch positions corresponding to said valve operating positions, a closed thermal system including a sensing bulb and an expansion element connected thereto, second switching means associated with said expanding element of said thermal system and being operated between two switching positions with predetermined changes in ambient temperature as sensed by said sensing bulb, reversing switch means and temperature responsive means on said valve means to be responsive to the temperature of a fluid adapted to be valved by said valve means, said reversing switch means being connected to and cooperating with said second switching means for reversing the effect of its operation, and circuit means including connection means connected to a source of power and connected through said second switch means of said thermal system through said reversing means and said motor switch means to said motor in a series energizing circuit.

6. In a motorized valve, a unidirectionally operated motor, valve means connected to said motor to be operated thereby, said valve means having operating positions corresponding to limited rotation of said motor, means mounting said motor means on said valve means and connecting said motor means to said valve means, switch means connected to and operated by said motor having limiting switch positions corresponding to said valve operating positions, a closed thermal system including a sensing bulb and an expansion element connected thereto, second switch means associated with said expansion element of said thermal system and being operated between its two switching positions with predetermined changes in ambient temperature as sensed by said sensing bulb from a predetermined temperature, reversing switch means and temperature responsive means associated therewith adapted to operate said reversing switch means between switching positions, means positioning said last-named temperature responsive means on said valve means to be responsive to the temperature of a fluid adapted to be valved by said valve means, said reversing switch means being connected to and cooperating with said second switching means for reversing the effect of its operation, and series circuit means adapted to be connected to a source of power and connecting through said second switch means of said thermal system through said reversing switch means and said motor operated switch means to said motor.

References Cited in the file of this patent
UNITED STATES PATENTS

| 2,957,680 | Sterner | Oct. 25, 1960 |
| 3,084,864 | Snoberger | Apr. 9, 1963 |